Figures 1, 2:
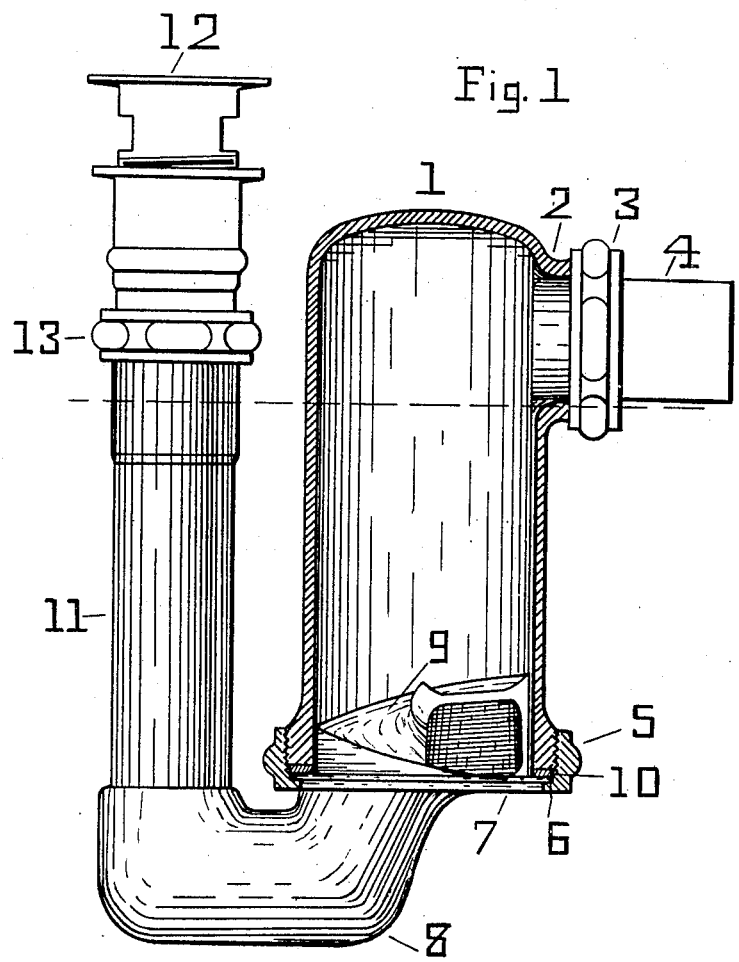

No. 869,625. PATENTED OCT. 29, 1907.
L. A. CORNELIUS.
TRAP.
APPLICATION FILED JULY 5, 1906.

WITNESSES:
H. Upholt
Mary S. Tooker

INVENTOR.
Louis A. Cornelius
BY Edward Taggart
his ATTORNEY.

UNITED STATES PATENT OFFICE.

LOUIS A. CORNELIUS, OF GRAND RAPIDS, MICHIGAN.

TRAP.

No. 869,625.  Specification of Letters Patent.  Patented Oct. 29, 1907.

Application filed July 5, 1906. Serial No. 324,821.

*To all whom it may concern:*

Be it known that I, LOUIS A. CORNELIUS, a citizen of the United States, residing at Grand Rapids, in the county of Kent and State of Michigan, have invented new and useful Improvements in Traps, of which the following is a specification.

My invention relates to improvements in traps, and is especially adapted for waste water or sewer traps, or any use where the evil results of siphoning are to be avoided.

It relates especially to that class of traps in which the water, passing through is made to take a revolving action, thereby measurably scouring the sides of the trap and preventing the deposits of waste matter which will occur in a trap where considerable spaces are occupied by stationary water. This object I accomplish by the means shown in the accompanying drawings, in which Figure 1 is a perspectve view of the device with portions cut away, and shown sectionally and with interior portions thus exposed to the perspective, and Fig. 2 is a top plan view of the lower member of the device.

The body of the trap is a substantially cylindrical member, represented by 1, closed at the top and open at the bottom. Near its upper portion it has the transverse horizontal outlet 2, which, by the coupling 3, is attached to the outlet pipe 4. Near its bottom and on its external surface, it is provided with a screw thread engaging with an internal screw-threaded coupling 5. This coupling is provided in its upper portion with such internal screw thread, and in its lower portion with an inwardly projecting annular flange 6, whereby it engages the bottom member of the trap. This bottom member is one solid piece, shown integrally in Fig. 2 and comprising the trap bottom 7, the extension 8 and the deflecting diaphragm 9. The trap bottom 7 forms a closure or support for the bottom of the trap, and its edge is closely engaged by the internal annular flange of the coupling 5, so that when this coupling is screwed up into place a tight joint is formed between the upper and lower members of the trap and this joint may be made perfectly water tight by any suitable means. A packing ring 10 is shown in the drawings. This bottom member extends and is developed downwardly into the extension 8 which may extend horizontally or in any desired direction, and which is fitted to receive a short piece of inlet pipe which I design to attach somewhat permanently to the extension 8 so that this short piece of inlet pipe shown in the drawings by 11 becomes a part of the permanent trap. The main inlet connection 12 may be attached to this inlet 11, and thereby, through the extension 8, to the bottom member of the trap, by means of the ordinary coupling 13. Upon its upper surface this bottom member 7 is developed into the peculiar form which may be described as like a snail shell, shown in perspective in Fig. 1, and in top plan in Fig. 2, and between the lower extension 8 and this upward development 9 there is free opening through the bottom plate 7. It is apparent, therefore, that the water entering from the inlet connection 12 under some pressure will pass through this bottom member and through this development of the same which I have described as like a snail shell, and will thereby be discharged into the trap from the bottom, but with a peculiar revolving and spiral upward motion necessarily caused by the described peculiar shape of its entrance. I have found this special construction and special motion of the water to be peculiarly efficacious in maintaining the interior of the trap in proper condition and preventing objectionable deposits on the bottom and sides thereof, and in driving through the trap the larger objects which frequently gain entrance. At the same time, by my construction, I am enabled normally to maintain in the trap a volume of water as high as the dotted line in Fig. 1, and it is practically impossible that any siphoning should occur which would break the water seal, as so great a surplus is provided.

It should be noticed also that by my peculiar form of construction, even after the water is siphoned or evaporated from the main body of this trap, if that ever does occur, there will still be a complete water seal preserved in the inlet pipe 8, below the bottom of the main body portion, and this finally remaining water seal will be subject to little evaporation, both because of the smaller water surface exposed, and because of the protection which the diaphragm 9 gives against evaporation at that point.

It will also be apparent by this construction that I provide a trap, the main body of which has a plain and smooth interior with no internal pipes or tubes, so that there are not protuberances, roughness of surface or obstacles of any kind tending to obstruct the passage of solid matter through the trap or tending to collect sediment or dirt, but, on the contrary, the tendency is to carry through the trap and out of the outlet all matter of this description.

I can, also, by the described couplings 3 and 13, easily attach the trap to the plumbing system in almost any place or position, and by the couplings 5 and 13, can easily remove the same temporarily for inspection or for cleaning; while the coupling 5, permitting as it does the top member to turn for a considerable part of a revolution without affecting the efficiency of the joint, allows the outlet pipe 4 to occupy any desired angle of variance from the plane of the inlet.

The water inlet into the trap from the bottom member extends from approximately the center out to approximately the edge, as shown in Fig. 2.

Having thus described my invention, what I claim to have invented, and desire to secure by Letters Patent, is—

A trap of the class described comprising a hollow cylindrical body having an outlet near its top and provided with an open bottom, an inlet pipe, means for detachably connecting one end of the inlet pipe with the open bottom end of the body to form water-tight communication between the same at one side of the longitudinal axis of said body, and a spiral diaphragm arranged at the point of communication between the inlet pipe and hollow body.

In testimony whereof I have hereunto set my hand in presence of two subscribing witnesses.

LOUIS A. CORNELIUS.

Witnesses:
 HENRY UPHOLT,
 H. C. CORNELIUS.